United States Patent [19]

Huber et al.

[11] Patent Number: 5,612,786
[45] Date of Patent: Mar. 18, 1997

[54] CONTOUR MEASUREMENT SYSTEM

[75] Inventors: Edward D. Huber, Sunnyvale; Rick A. Williams, Orinda; Dean M. Shough, Newark, all of Calif.; Osuk Y. Kwon, Seoul, Rep. of Korea; Rebecca L. Welling, La Honda, Calif.

[73] Assignee: Lockheed Missiles & Space Company, Inc., Sunnyvale, Calif.

[21] Appl. No.: 569,524

[22] Filed: Dec. 8, 1995

Related U.S. Application Data

[63] Continuation of Ser. No. 249,841, May 26, 1994, abandoned.

[51] Int. Cl.$^6$ ................................................. G01B 11/24
[52] U.S. Cl. ................. 356/376; 250/237 G; 250/559.22
[58] Field of Search ...................... 356/376; 250/237 G, 250/559.22

[56] References Cited

U.S. PATENT DOCUMENTS

| | | | |
|---|---|---|---|
| 4,488,172 | 12/1984 | Hutchin | 358/107 |
| 4,575,805 | 3/1986 | Moermann | 364/474 |
| 4,641,972 | 2/1987 | Halioua | 356/376 |
| 4,825,263 | 4/1989 | Desjardins | 356/376 |
| 5,085,502 | 2/1992 | Womack et al. | 356/376 |
| 5,175,601 | 12/1992 | Fitts | 356/376 |
| 5,307,151 | 4/1994 | Hof | 356/376 |
| 5,307,152 | 4/1994 | Boehnlein et al. | 356/376 |

OTHER PUBLICATIONS

David R. Burton et al., "Multichannel Fourier Fringe Analysis As An Aid to Automatic Phase Unwrapping", *Applied Optics*, May 10, 1994, vol. 33, No. 14, pp. 2939–2948.
Katherine Creath, "WYKO Systems for Optical Metrology", *SPIE vol. 816 Interferometric Metrology*, 1987, pp. 111–126.
Chris L. Koliopoulos et al., "Real–Time Video Rate Phase Processor", *SPIE vol. 2003 Interferometry VI*, 1993, pp. 264–268.
Daniel Malacara, "Optical Shop Testing", John Wiley & Sons, Inc., 1992, pp.668–681.

Carolyn R. Mercer et al., "Fiber–Optic Projected–Fringe Digital Interferometry", *NASA Technical Memorandum 103252 – 1990 Fall Conference on Hologram Interferometry and Speckle Metrology sponsored by the Society for Experimental Mechanics, Baltimore, Maryland*, Nov. 4–7, 1990, pp. 1–8.
B. F. Oreb et al., "Moire based Optical Surface Profiler for the Minting Industry", Preprint of article that appeared in *SPIE Proceedings*, vol. 1776, 1992, pp. 48–57.
James C. Wyant, "Interferometric Optical Metrology: Basic Principles and New Systems", *Laser Focus*, May 1982, pp. 65–71.
Yiping Xu et al., "Simple and Effective Phase Unwrapping Technique", *SPIE vol. 2003 Interferometry VI*, 1993, pp. 254–263.

*Primary Examiner*—F. L. Evans
*Attorney, Agent, or Firm*—Edward J. Radlo

[57] ABSTRACT

A method for measuring the contours (30) of a three-dimensional object (4); and a method for calibrating an optical system (2, 8). The object (4) is placed into the field of view of the optical system (2, 8). The optical system (2, 8) is activated to obtain a set of data giving a phase ($x_i$) at each of a plurality of pixels corresponding to the object (4). The phases ($x_i$) are unwrapped, e.g., by a method of ordered phase unwrapping. The unwrapped phases are converted into a set of three-dimensional coordinates ($x_s$, $y_s$, $z_s$) of the object (4) for each of the pixels. These coordinates ($x_s$, $y_s$, $z_s$) can be portrayed on a display of a computer (10). The method for calibrating the optical system (2, 8) shares several common steps with the above method. In addition, coordinates of a test calibration fixture (38, 46) are first mechanically measured. Following optical measurement of the calibration fixture (38, 46), an optimization procedure is used to minimize the difference between the mechanically measured coordinates ($x_m$, $y_m$, $z_m$) and the coordinates ($x_s$, $y_s$, $z_s$) calculated from the optical measurements. The optimization procedure in the calibration method fixes the intrinsic and extrinsic parameters of the optical system (2, 8). A blending method can be used to increase the dynamic range of the measured intensity. Phase shifting is performed by either a method of temporal phase shifting or a method of spatial phase shifting.

8 Claims, 10 Drawing Sheets

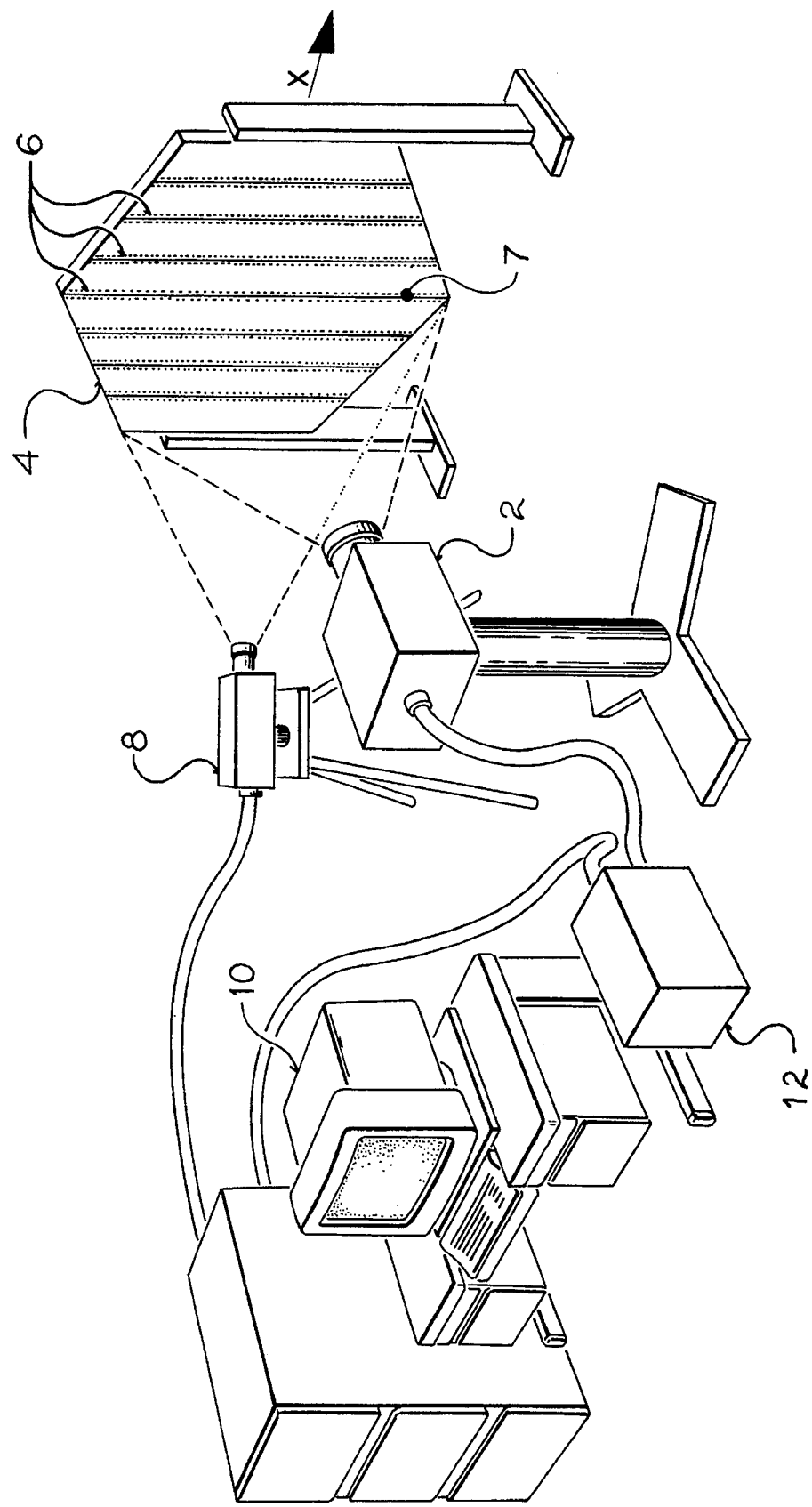
FIG_1

FIG_2A
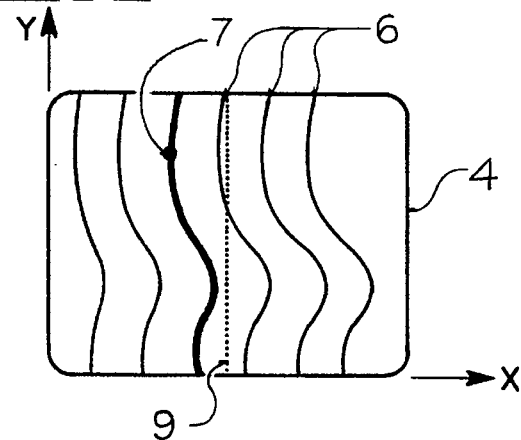
FIG_2B
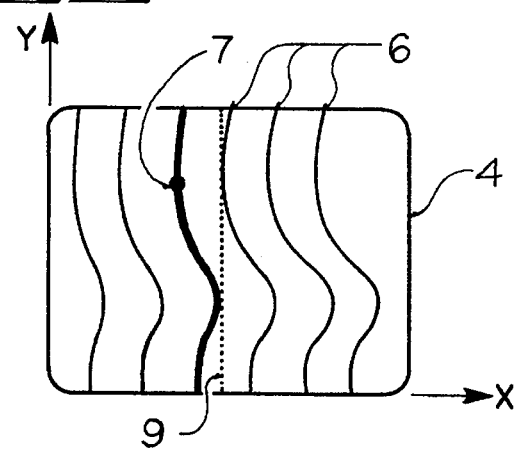
FIG_2C
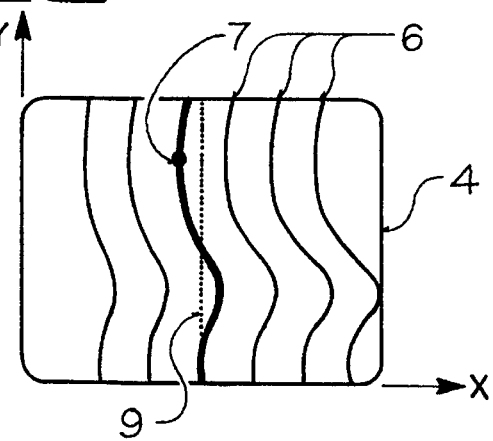

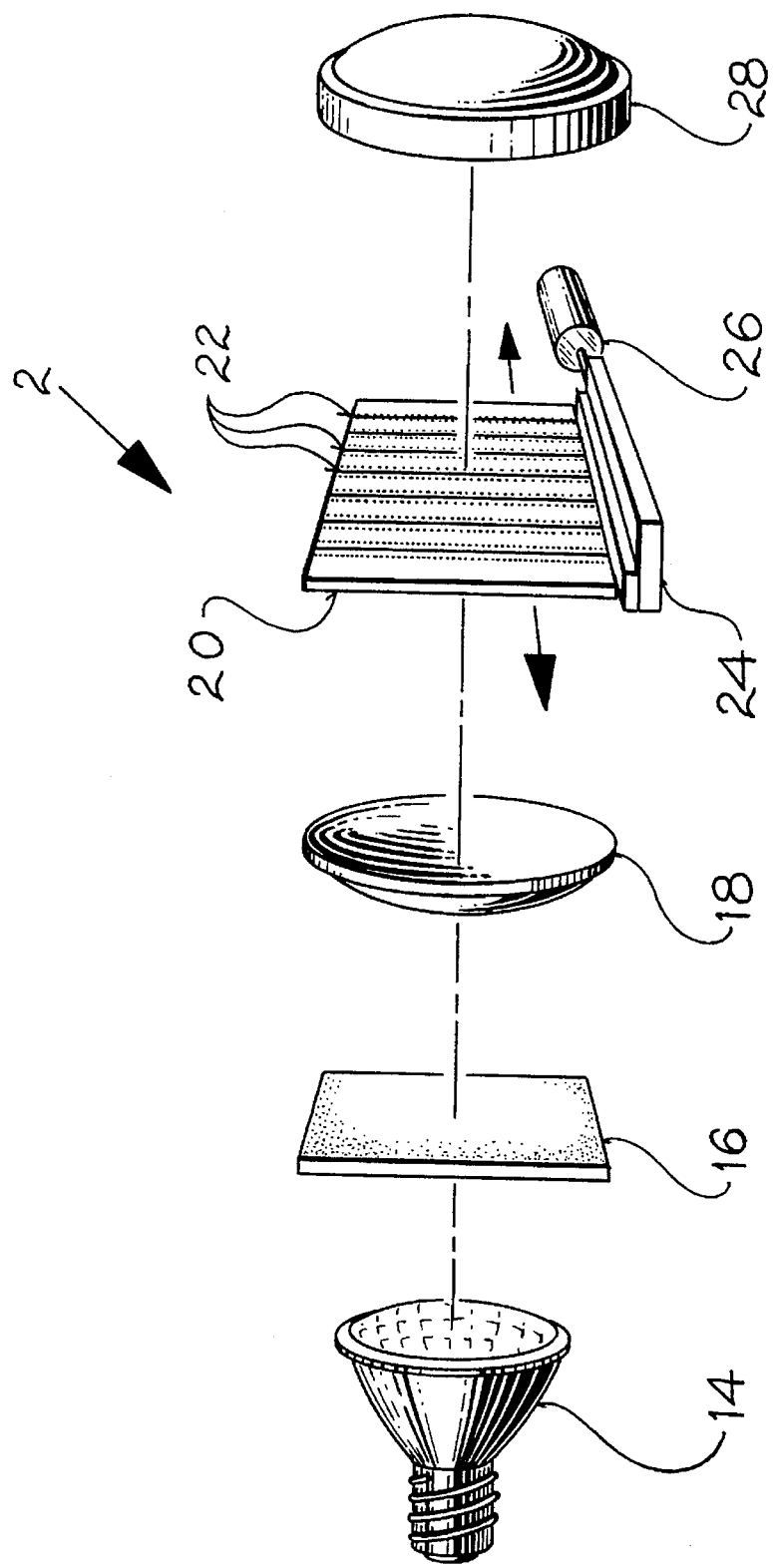

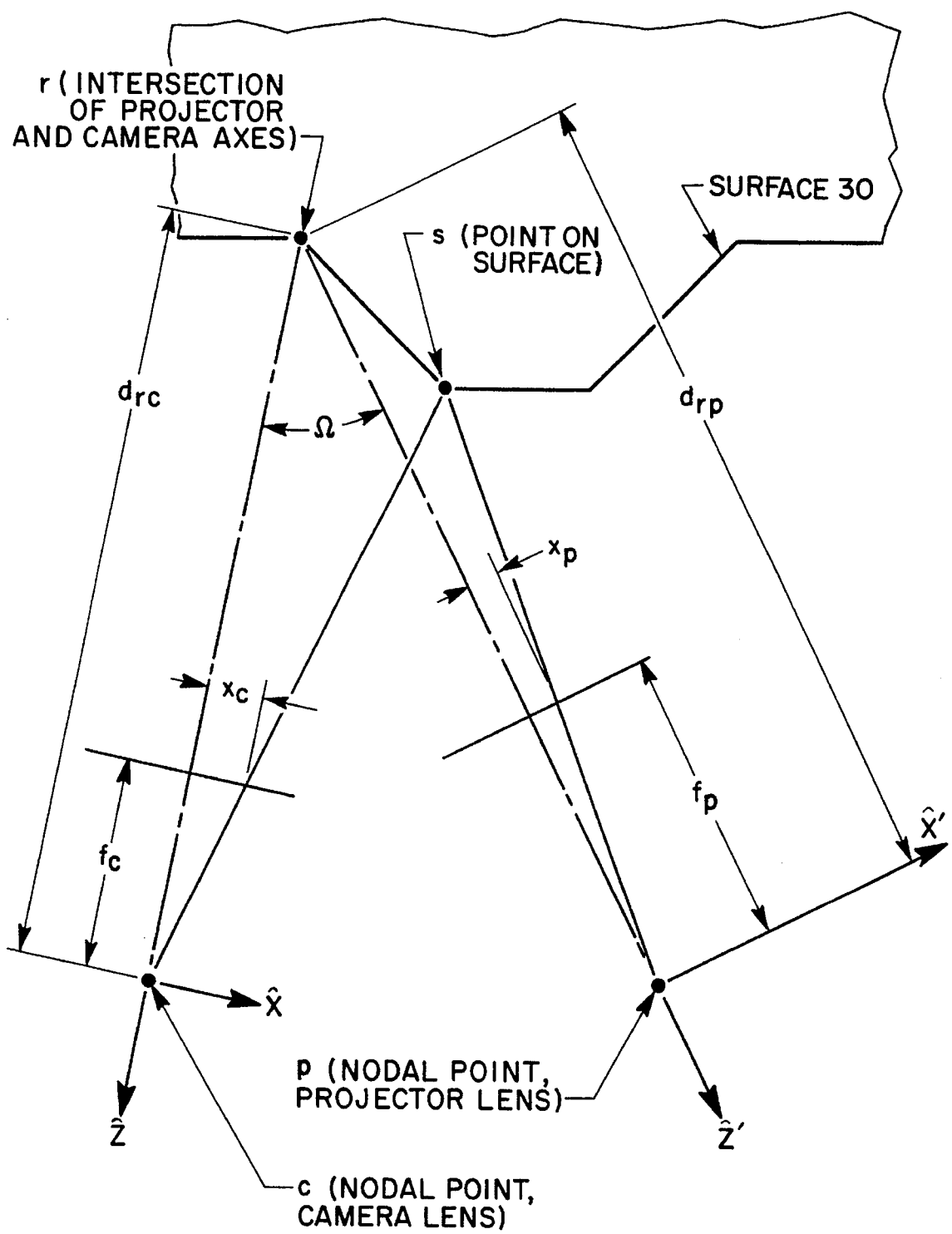
FIG_4

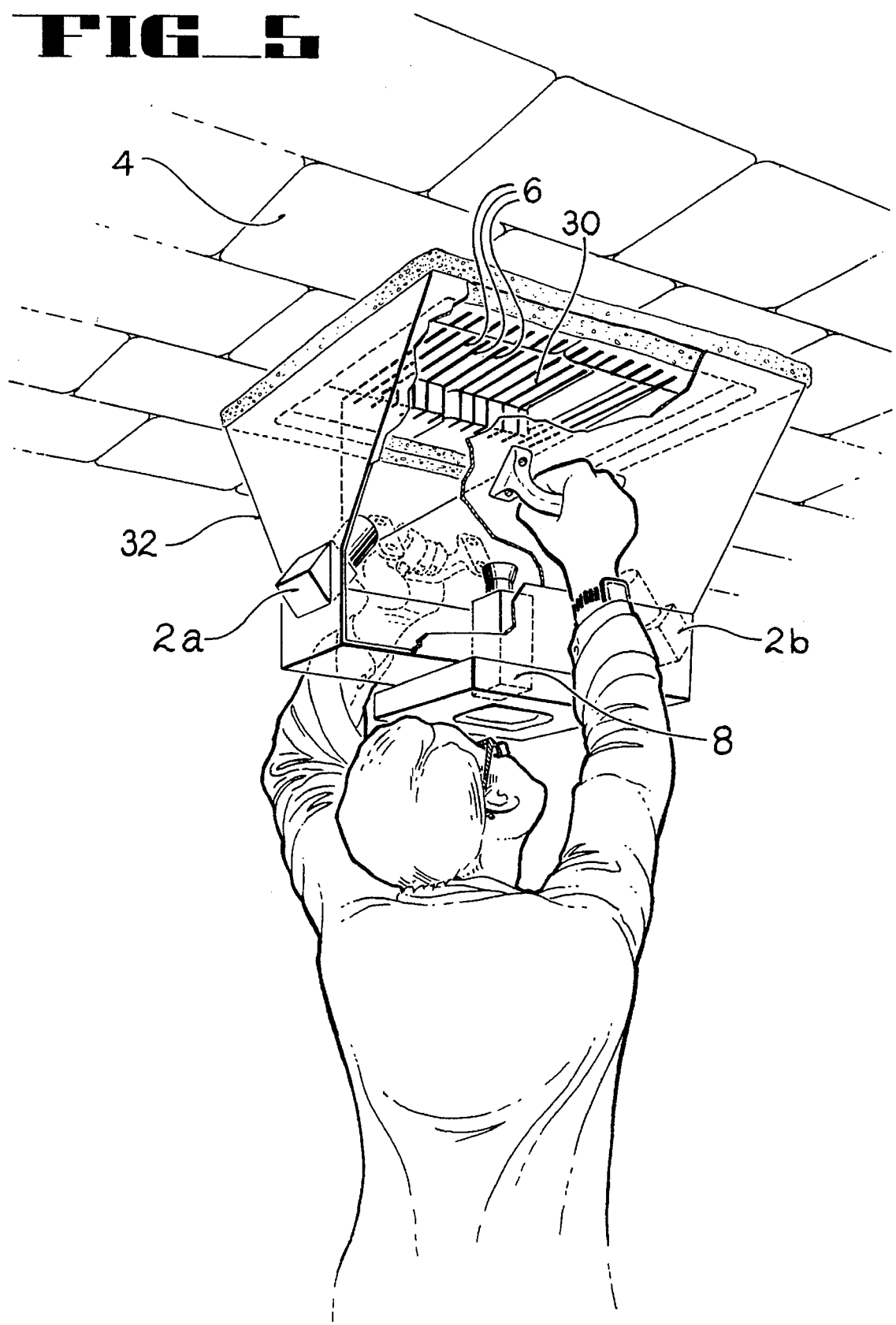
FIG_5

FIG_6A
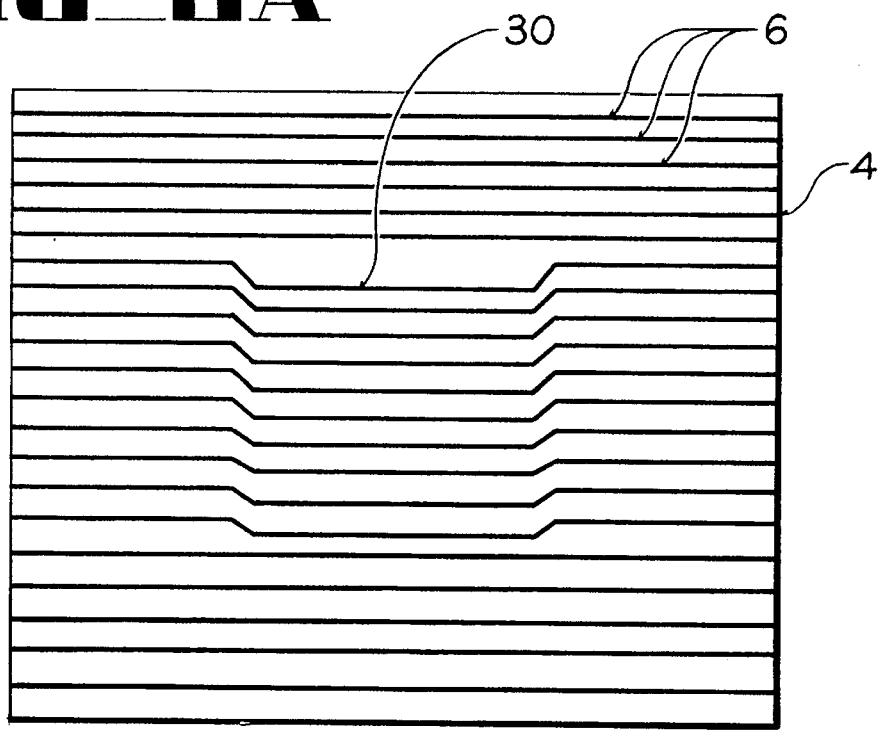
FIG_6B
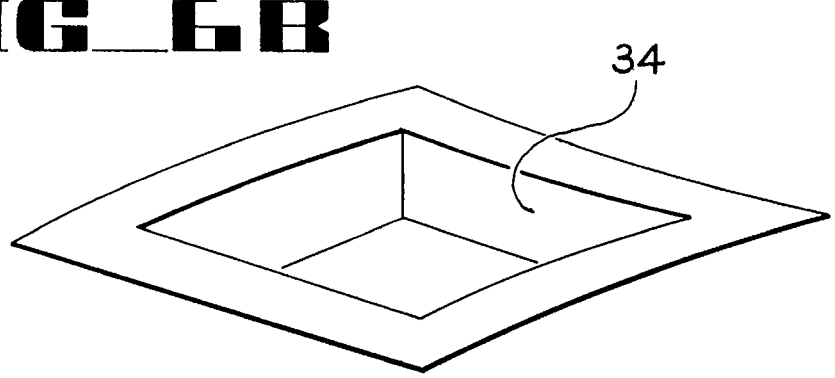
FIG_6C
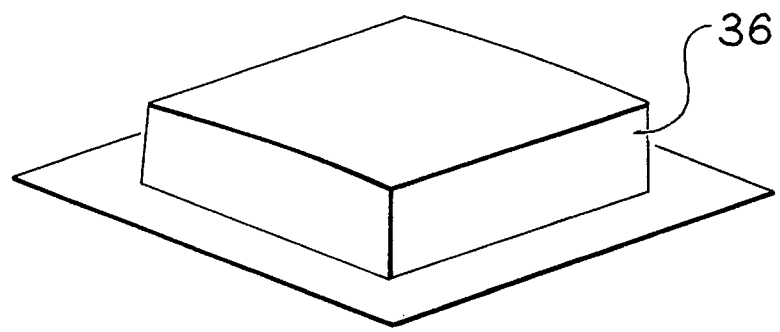

FIG_7A
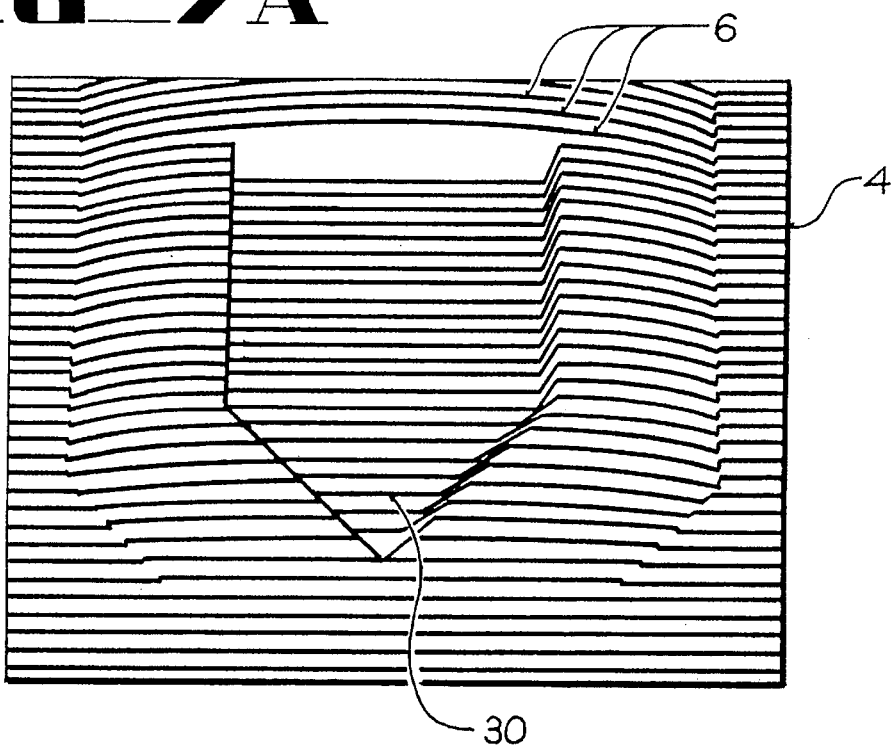
FIG_7B
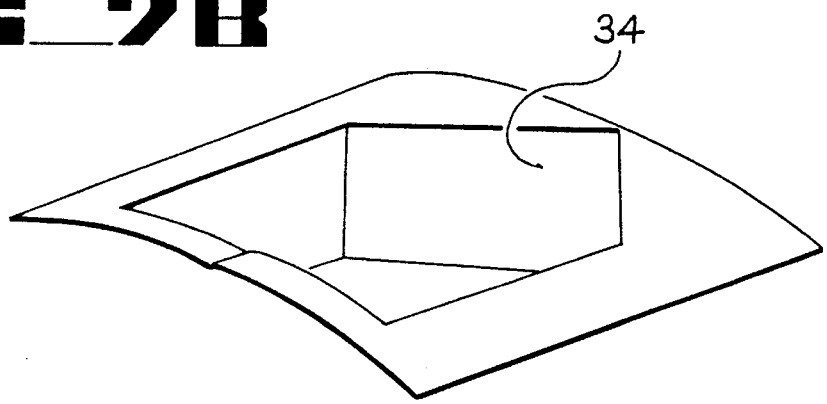
FIG_7C
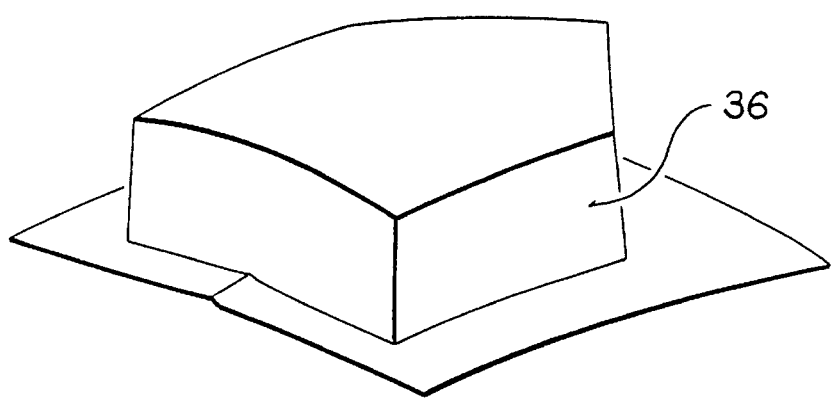

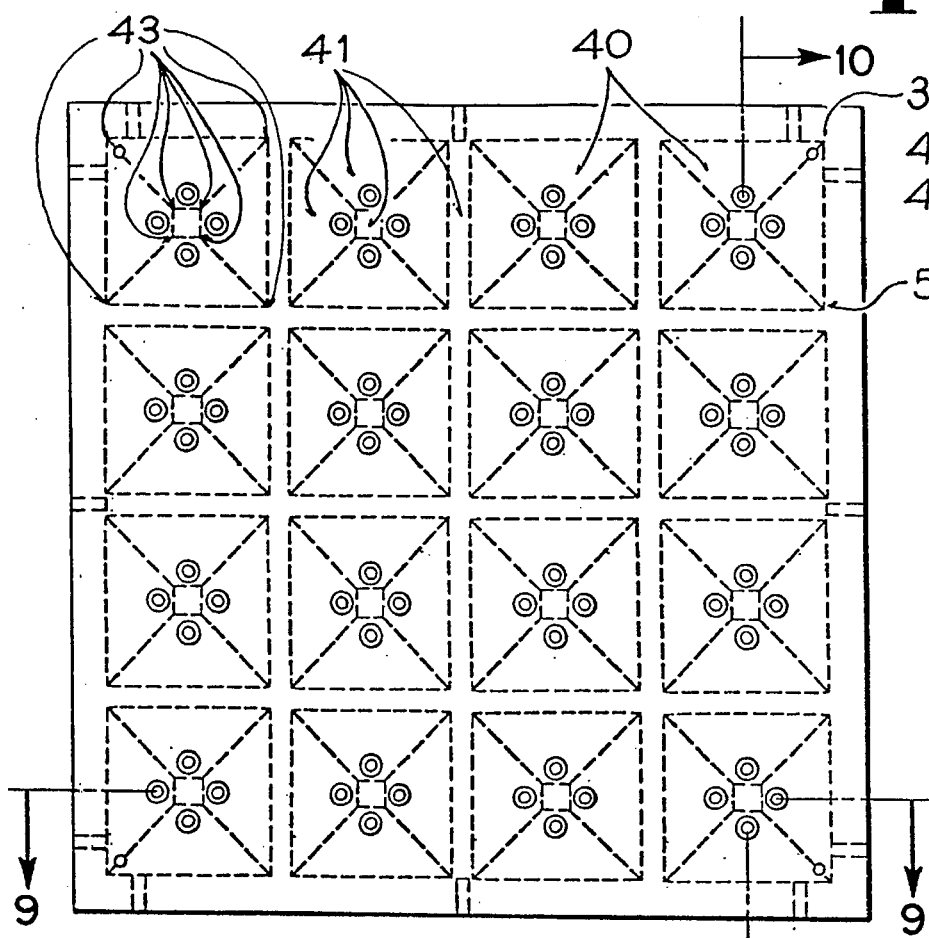
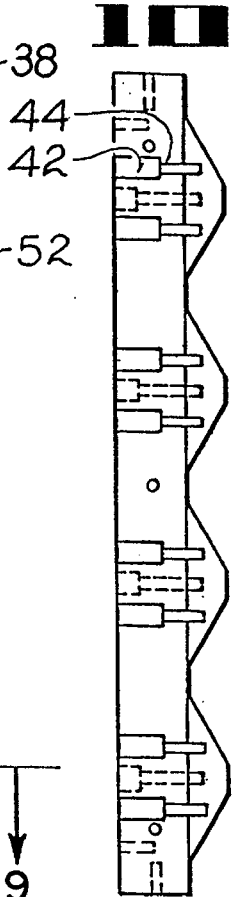
FIG_8
FIG_10
FIG_9

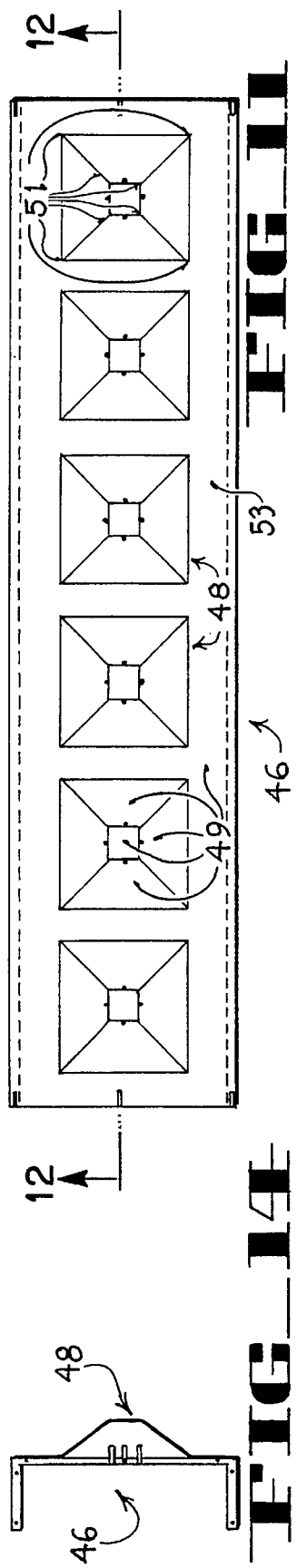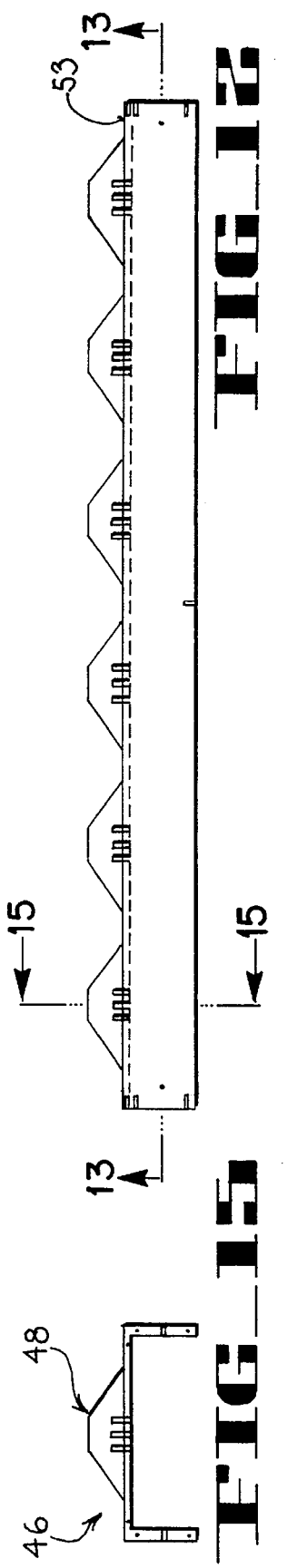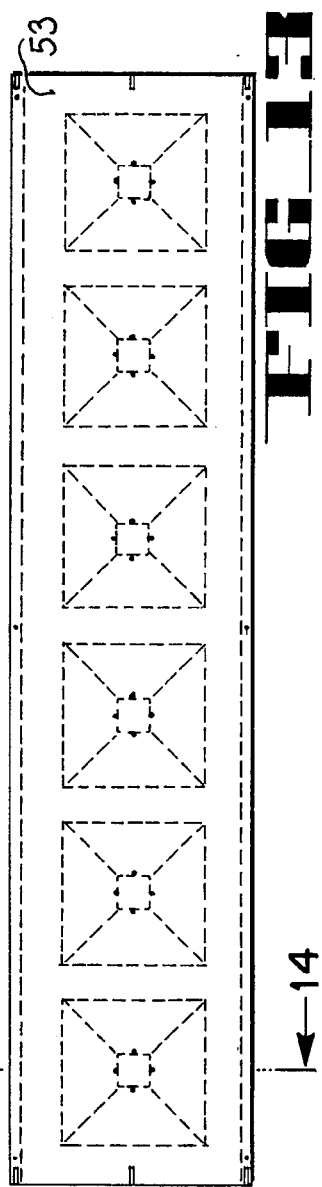

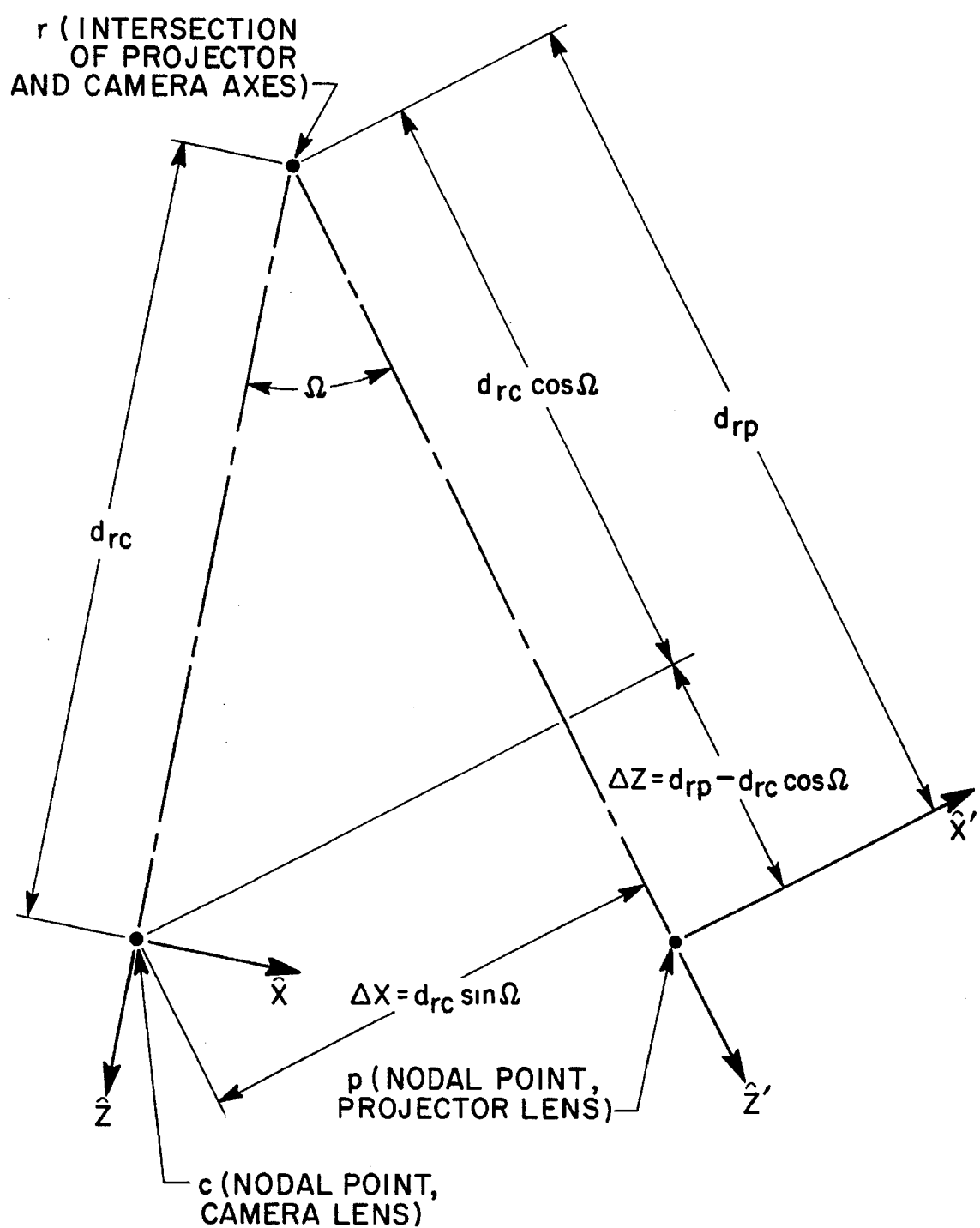
FIG_16

CONTOUR MEASUREMENT SYSTEM

RELATED APPLICATIONS

This is a continuation of U.S. patent application Ser. No. 08/249,841 filed on May 26, 1994, now abandoned.

DESCRIPTION

1. Technical Field

This invention pertains to the fields of a) optically measuring the contours of three-dimensional objects; and b) calibrating optical systems.

2. Background Art

In classical interferometry measurement techniques, measurement dynamic range and accuracy are very limited. High accuracy can be achieved over just a small range of depth.

Moiré technique measurements are more suited to measuring objects that are nearly two-dimensional, and require high frequency fringes for both projection and reference, making alignment and phase shifting problematic.

Photogrammetry measurement techniques are very slow and labor intensive, and provide high accuracy measurement for only a sparse set of points on a surface.

The present invention overcomes these disadvantages, by providing high accuracy depth measurements over a large range of depth. Measurement accuracy is assured through a reliable calibration procedure. This calibration procedure does not require tight alignment tolerances or assume ideal alignment. The measurement data for a surface are at very high resolution, to provide a full three-dimensional surface image. Measurements and data processing are done quickly. The projection system can use white light, which does not suffer from coherent light effect problems. Coarse gratings can be used with direct fringe line projection, reducing alignment and optical quality requirements, and minimizing phase shifting motion accuracy requirements. Temporal phase shifting provides high resolution three-dimensional measurements. Spatial phase shifting provides a high-speed (virtually instantaneous) measurement capability with some reduction in resolution.

DISCLOSURE OF INVENTION

The present invention encompasses a method for optically measuring the contours (30) of a three-dimensional object (4). The method comprises the steps of placing the object (4) into the field of view of an optical system (2, 8); activating the optical system (2, 8) to obtain a set of data giving a phase $(x_t)$ at each of a plurality of pixels corresponding to the object (4); unwrapping the phases $(x_t)$ by a method of ordered phase unwrapping; and converting the set of unwrapped phases into a set of three-dimensional coordinates $(x_s, y_s, z_s)$ of said object (4) for each of said pixels.

The present invention also encompasses a method for calibrating an optical system (2, 8).

BRIEF DESCRIPTION OF THE DRAWINGS

These and other more detailed and specific objects and features of the present invention are more fully disclosed in the following specification, reference being had to the accompanying drawings, in which:

FIG. 1 is a sketch of an optical system using the present invention.

FIGS. 2a, 2b, and 2c are a set of three frames of the projection of fringe lines 6 onto a viewed object 4.

FIG. 3 is an exploded diagram of a projector 2 suitable for use in the present invention.

FIG. 4 is a top view showing the geometry of the optical system 2, 8 of the present invention.

FIG. 5 is a sketch of an alternative embodiment of the optical system 2, 8 of the present invention.

FIGS. 6a, 6b, and 6c are a set of illustrations showing how the present invention can model a first object 4.

FIGS. 7a, 7b, 7c are a set of three illustrations showing how the present Invention can model a second object 4.

FIG. 8 is a bottom view of a first embodiment of a test calibration fixture 38 suitable for use in the present invention.

FIG. 9 is an end view of the test calibration fixture 38 of FIG. 8.

FIG. 10 is a side view of the test calibration fixture 38 of FIG. 8.

FIG. 11 is a top view of a second embodiment of a test calibration fixture 46 suitable for use in the present invention.

FIG. 12 is a side view of the test calibration fixture 46 depicted in FIG. 11.

FIG. 13 is a bottom view of the test calibration fixture 46 depicted in FIG. 11.

FIG. 14 is an end view of the test calibration fixture 46 depicted in FIG. 13.

FIG. 15 is an end view of the test calibration fixture 46 depicted in FIG. 12.

FIG. 16 shows the relation between coordinate systems for the geometry depicted in FIG. 4.

DETAILED DESCRIPTION OF THE PREFERRED EMBODIMENTS

With respect to the general embodiment depicted in FIG. 1, projector 2 is any projector capable of illuminating object 4 with a set of fringe lines 6. Projector 2 may use a white light or a monochromatic light source. It may provide continuous, flash, or strobe illumination. The boresight of the light emanating from projector 2 may be perpendicular to object 4 or, as depicted in FIG. 1, may form an other than 90° angle therewith. The fringe lines 6 falling on object 4 are made to have a sinusoidally varying intensity as seen by camera 8; this variation is in the x (horizontal) direction in the preferred embodiment. The lines 6 illustrated in FIG. 1 represent lines of maximum intensity. They are vertically disposed in this embodiment. These lines 6 are 360° apart in phase. One fringe line 6 is identified with a fiducial spot 7 to establish a reference for phase and position calculations during calibration and measurement operational modes.

Camera 8 has a field of view encompassing all or part of object 4. Camera 8 may be any electronic camera, such as a CCD, CID, or Vidicon camera or film. The boresight of camera 8 may be perpendicular to object 4, or, as depicted in FIG. 1, may form an other than 90° angle therewith. The image plane of camera 8 is divided into a set of pixels, e.g. 640×480 pixels. Camera 8 may or may not employ frame integration.

The image data recorded by camera 8 are fed into computer 10, e.g., a computer workstation containing a display, storage, and user interface, such as a keyboard, trackball, and/or mouse.

Electronic controller 12 is coupled between computer 10 and projector 2. The purpose of controller 12 is to synchronize camera 8 with projector 2, e.g., when projector 2 is flashing or strobing, and to move the slide 20 on the translation stage 24 by means of the motor 26 within the projector 2 that produces the fringe line pattern 6 on object 4 in the temporal phase shifting embodiment (see FIG. 3).

FIGS. 2a, 2b, and 2c illustrate three successive frames of fringe lines 6 being projected onto object 4. The fact that fringe lines 6 are not completely straight but rather exhibit bumps in the vertical (y) dimension indicates the presence of a contour on object 4, i.e. a change in its depth (z) dimension. One of the fringe lines is marked with a fiducial spot 7 and is highlighted here, simply to show how fringe lines 6 move past a center reference line 9 in successive frames.

In FIGS. 2, the successive frames are 90° apart, and there are three frames. Hence, this embodiment is called the three-bucket algorithm. Alternatively, a four-bucket algorithm could be used, wherein the frames are, relatively speaking, at 0° phase, 90° phase, 180° phase, and 270° phase. The four-bucket algorithm is less prone to errors than the three-bucket algorithm, but takes more processing time. Another alternative method is the Carré method. In the Carré method, the phase shifts between frames can be other than 90°. These are just three examples of algorithms borrowed from phase-shifting interferometry. Any phase-shifting algorithm may be used in the present invention.

Generally speaking, the irradiance distribution of an interference pattern can be written as:

$$I(x,y) = I_{bias}(x,y) + I_{mod}(x,y) \cos(p(x,y)+d)$$

where $I(x,y)$ is the intensity at point x,y; $I_{bias}$ is the background intensity; $I_{mod}$ is the modulation intensity; p is the phase; and d is an arbitrary phase factor based upon where x=0 is (arbitrarily) defined to be on the sinusoid.

There are three unknown quantities: $I_{bias}(x,y)$, $I_{mod}(x,y)$, and $p(x,y)$.

In the three-bucket algorithm, the irradiance distribution can be written as three simultaneous equations as follows, where A, B, and C represent the three frames:

$$I_A(x,y) = I_{bias}(x,y) + I_{mod}(x,y) \cos(p(x,y)+pi/4)$$

$$I_B(x,y) = I_{bias}(x,y) + I_{mod}(x,y) \cos(p(x,y)+2pi/4)$$

$$I_C(x,y) = I_{bias}(x,y) + I_{mod}(x,y) \cos(p(x,y)+3pi/4)$$

These values of intensity are fed into computer 10, which uses the solution for these three simultaneous equations to determine the phase, p (x, y). as follows:

$$p(x,y) = \tan^{-1} \frac{I_C(x,y) - I_B(x,y)}{I_A(x,y) - I_B(x,y)}$$

This is done for each pixel, and becomes the raw phase map. In addition, in the preferred embodiment, the signal-to-noise ratio W is also obtained for each pixel. In the following mathematical derivation, $p(x,y)$ is defined as $x_i$; and $x_0$ and $y_0$ are the pixel location within the image plane of camera 8. Other phase-shifting algorithms result in different equations for $p(x,y)$.

MATHEMATICAL DERIVATION

This derivation gives the mathematics required to calculate the xyz location of points on surface 30 of object 4 from a grating projection 6 and its image within camera 8. Other coordinate systems/equations are possible. From the projector 2, we know the phase x of the points. This corresponds to a line projected through a point (the nodal point of the projector lens). This constrains xyz to line on a plane. From the camera 8 we know the xy pixel location. This constrains xyz to lie along a line. The intersection of the plane and the line determines xyz of a unique point.

FIG. 4 shows a top view of the geometry. All distances and angles shown are positive as drawn. Note that the camera 8 focal plane and the projector 2 grating are not shown in FIG. 4; rather, the positive image of each are shown. Note also that only the ratios of the xy position to the focal length matter. Two right-handed coordinate systems are shown. The unprimed system is aligned with the camera's focal plane and the principal axis of the camera 8 lens. Its origin is the nodal point c for the camera 8 lens. The primed system is aligned with the grating stripes 6 and has its origin at the nodal point p for the projector 2 lens. For both coordinate systems, the z axis lies along the axis of the lens and points away from the test surface 30. The y axis direction is then determined by rotating the coordinate system around the lens axis until the grating stripes 6 do not vary in the x direction.

In this derivation, the subscript "c" refers to camera 8, and the subscript "p" refers to projector 2.

In FIG. 4 (as well as FIG. 16), the "intersection" r of the camera 8 and projector 2 axes is shown. Strictly speaking, in three-dimensional space, these axes may not intersect, because camera 8 and projector 2 may lie in different planes. However, FIGS. 4 and 16 compress three dimensions into two, so that in the plane of each of FIGS. 4 and 16, theses axes do intersect.

CAMERA EQUATIONS

First, consider the image of the surface 30 as seen by the camera 8. In the coordinate system attached to the focal plane, the image occurs at $(x_0,y_0, 0)$. The correction for the tip and tilt of the camera 8 focal plane can be computed as a rotation about the y axis followed by a rotation about the x axis as follows:

$$\begin{aligned} x_{cc} &= x_0\cos\theta_y &&+ y_0\sin\theta_x\sin\theta_y \\ y_{cc} &= &&+ y_0\cos\theta_x \\ z_{cc} &= x_0\sin\theta_y &&- y_0\sin\theta_x\cos\theta_y \end{aligned} \qquad [1]$$

The distortion can be included by:

$$x_c = x_{cc} + \Delta x(x_{cc}, y_{cc})$$

$$y_c = y_{cc} + \Delta y(x_{cc}, y_{cc}) \qquad [2]$$

We ignore the small effect that $z_c$ (due to tip and tilt) would have even though the distortion should be based on the angle relative to the optical axis.

Next we translate from the coordinate system located at the focal plane to one located at the nodal point c of the camera 8 lens. This is done by subtracting $f_c$ from $z_c$. We know that the surface point must lie along the line containing the origin (nodal point) and the pixel. The equation for this line is $$\frac{x}{x_c} = \frac{y}{y_c} = \frac{z}{z_c} \qquad [3]$$

where $z_c \cong -f_c$.

PROJECTOR EQUATIONS

Let us now introduce tip, tilt, and distortion to the grating 22. In a double primed coordinate system attached to the grating 22 the parametric form for the equation of a grating line 6 is:

$$x'' = x_p + \Delta x(x_p,t)$$
$$y'' = t + \Delta y(x_p,t) \quad [4]$$
$$z'' = 0$$

where $X_p$ is measured from the fringe line 6 with the fiducial spot 7, and the parameter t varies over the range $-\infty \to \infty$. The terms $\Delta x(x_p,t)$ and $\Delta y(x_p,t)$ let us introduce whatever form we wish for distortion. Next, we apply a rotation about the y axis then a rotation about the x axis. Before collecting and rearranging, we have:

$$x'\cos\theta_y + y'\sin\theta_x\sin\theta_y - z'\cos\theta_x\sin\theta_y = x_p + \Delta x(t) \quad [5]$$
$$+ y'\cos\theta_x + z'\sin\theta_x = t + \Delta y(t)$$
$$x'\sin\theta_y - y'\sin\theta_x\cos\theta_y + z'\cos\theta_x\cos\theta_y = 0$$

After rearranging and translating to the nodal point:

$$x' = + (x_p + \Delta x(t))\cos\theta_y \quad [6]$$
$$y' = (t + \Delta y(t))\cos\theta_x + (x_p + \Delta x(t))\sin\theta_x\sin\theta_y$$
$$z' = (t + \Delta y(t))\sin\theta_x - (x_p + \Delta x(t))\cos\theta_x\sin\theta_y - f_p$$

This is the equation for the (curved) grating line 6. The general equation for a straight line through any two points is:

$$\frac{x - x_0}{x_1 - x_0} = \frac{y - y_0}{y_1 - y_0} = \frac{z - z_0}{z_1 - z_0} \quad [7]$$

where the subscripts refer to two different points that the line passes through. In our case, subscript zero is the origin (nodal point) and subscript one is a point on the grating 22 specified by the parameter t. As the t parameter is varied, the line sweeps out a curved surface. The equation for the surface produced when this line is projected through the nodal point p of the projector 2 lens is:

$$\frac{x'(t)}{(x_p + \Delta x(t))\cos\theta_y} = \frac{y'(t)}{\left\{\begin{array}{l}(t + \Delta y(t))\cos\theta_x \\ +(x_p + \Delta x(t))\sin\theta_x\sin\theta_y\end{array}\right\}} = \frac{z'(t)}{\left\{\begin{array}{l}(t + \Delta y(t))\sin\theta_x \\ -(x_p + \Delta x(t))\cos\theta_x\sin\theta_y - f_p\end{array}\right\}} \quad [8]$$

TRANSFORMING PROJECTOR TO CAMERA COORDINATES

Next, we need to rotate the primed coordinate system until it is aligned with the unprimed system. We do this by first translating and then rotating the origin. The effect is to change the form for equation 8. The change is effected by expressing the old, primed (x',y',z') coordinates in terms of the revised, unprimed (x, y, z) coordinates. First, Figure shows the major transformations that we need, the translations in x and z plus the rotation about the y axis. The translation is:

$$x' = x - d_{re} \sin \Omega$$
$$z' = z - d_{rp} + d_{re} \cos \Omega \quad [9]$$

The rotation by $\Omega$ about the y axis produces:

$$x' = x \cos \Omega - z \sin \Omega$$
$$z' = x \sin \Omega + z \cos \Omega \quad [10]$$

Combining the translation and then the rotation produces:

$$x' = x \cos \Omega - z \sin \Omega - d_{re} \sin \Omega$$
$$z' = x \sin \Omega + z \cos \Omega + d_{re} \cos \Omega\Omega - d_{rp} \quad [11]$$

This is the transformation needed when the system is perfectly aligned. This has been verified for the special cases of $\Omega_y = 0°$, $\pm 90°$, and $180°$.

Instead of looking at the case of a perfectly aligned projector 2 as done for equation 8, the more general case of translation and rotation in all three axes follows:

$$\begin{aligned}
x' = {} & x[\cos\Omega_y\cos\Omega_z - \sin\Omega_x\sin\Omega_y\sin\Omega_z] \quad [12]\\
& +y[\cos\Omega_y\sin\Omega_z + \sin\Omega_x\sin\Omega_y\cos\Omega_z]\\
& -z[\cos\Omega_x\sin\Omega_y]\\
& -d_{re}\sin\Omega_y\\
y' = {} & -x[\cos\Omega_x\sin\Omega_z]\\
& +y[\cos\Omega_x\cos\Omega_z]\\
& +z[\sin\Omega_x]\\
& +\Delta_y\\
z' = {} & x[\sin\Omega_y\cos\Omega_z + \sin\Omega_x\cos\Omega_y\sin\Omega_z]\\
& +y[\sin\Omega_y\sin\Omega_z - \sin\Omega_x\cos\Omega_y\cos\Omega_z]\\
& +z[\cos\Omega_x\cos\Omega_y]\\
& +d_{re}\cos\Omega_y - d_{rp}
\end{aligned}$$

Substituting equation 12 back into equation 8 now gives:

$$\frac{\left\{\begin{array}{l} x(t)[\cos\Omega_y\cos\Omega_z - \sin\Omega_x\sin\Omega_y\sin\Omega_z] \\ +y(t)[\cos\Omega_y\sin\Omega_z + \sin\Omega_x\sin\Omega_y\cos\Omega_z] \\ -z(t)[\cos\Omega_x\sin\Omega_y] - d_{re}\sin\Omega_y\end{array}\right\}}{(x_p + \Delta x(t))\cos\theta_y} = \quad [13]$$

$$\frac{\left\{\begin{array}{l}-x(t)[\cos\Omega_x\sin\Omega_z] \\ +y(t)[\cos\Omega_x\cos\Omega_z] + z(t)[\sin\Omega_x] + \Delta_y\end{array}\right\}}{(t + \Delta y(t))\cos\theta_x + (x_p + \Delta x(t))\sin\theta_x\sin\theta_y} =$$

$$\frac{\left\{\begin{array}{l}x(t)[\sin\Omega_y\cos\Omega_z + \sin\Omega_x\cos\Omega_y\sin\Omega_z] \\ +y(t)[\sin\Omega_y\sin\Omega_z - \sin\Omega_x\cos\Omega_y\cos\Omega_z] \\ +z(t)[\cos\Omega_x\cos\Omega_y] + d_{re}\cos\Omega_y - d_{rp}\end{array}\right\}}{(t + \Delta y(t))\sin\theta_x - (x_p + \Delta x(t))\cos\theta_x\sin\theta_y - f_p}$$

SOLVING FOR INTERSECTION

Substituting equation 3 into the above and eliminating x and z gives:

$$\frac{y(t)\left\{\begin{array}{l}x_c[\cos\Omega_y\cos\Omega_z - \sin\Omega_x\sin\Omega_y\sin\Omega_z] \\ +y_c[\cos\Omega_y\sin\Omega_z + \sin\Omega_x\sin\Omega_y\cos\Omega_z] \\ -z_c[\cos\Omega_x\sin\Omega_y]\end{array}\right\} - y_c d_{re}\sin\Omega_y}{(x_p + \Delta x(t))\cos\theta_y} = \quad [14]$$

$$\frac{y(t)\left\{\begin{array}{l}-x_c[\cos\Omega_x\sin\Omega_z] \\ +y_c[\cos\Omega_x\cos\Omega_z] + z_c[\sin\Omega_x]\end{array}\right\} + y_c\Delta_y}{(t + \Delta y(t))\cos\theta_x + (x_p + \Delta x(t))\sin\theta_x\sin\theta_y} =$$

$$\frac{\left\{\begin{array}{l}x_c[\sin\Omega_y\cos\Omega_z + \sin\Omega_x\cos\Omega_y\sin\Omega_z] \\ +y_c[\sin\Omega_y\sin\Omega_z - \sin\Omega_x\cos\Omega_y\cos\Omega_z] \\ +z_c[\cos\Omega_x\cos\Omega_y]\end{array}\right\} + y_c d_{rc}\cos\Omega_y - y_c d_{rp}}{(t + \Delta y(t))\sin\theta_x - (x_p + \Delta x(t))\cos\theta_x\sin\theta_y - f_p}$$

There are two unknowns, y and t, for these two equations. These equations can be further simplified by making the following substitutions:

$$a_1 = x_c[\cos\Omega_y\cos\Omega_z - \sin\Omega_x\sin\Omega_y\sin\Omega_z] + \\ y_c[\cos\Omega_y\sin\Omega_z + \sin\Omega_x\sin\Omega_y\cos\Omega_z] - z_c[\cos\Omega_x\sin\Omega_y]$$
$$c_1 = -d_{rc}\sin\Omega_y$$
$$d_1 = (x_p + \Delta x(t))\cos\Omega_y$$
$$a_2 = -x_c[\cos\Omega_x\sin\Omega_z] + y_c[\cos\Omega_x\cos\Omega_z] + z_c[\sin\Omega_x]$$
$$b_2 = \cos\theta_x$$
$$c_2 = \Delta_y$$
$$d_2 = \Delta y(t)\cos\theta_x + (x_p + \Delta x(t))\sin\theta_x\sin\theta_y$$
$$a_3 = x_c[\sin\Omega_y\cos\Omega + \sin\Omega_x\cos\Omega_y\sin\Omega_z] + \\ y_c[\sin\Omega_y\sin\Omega - \sin\Omega_x\cos\Omega_y\cos\Omega_z] + z_c[\cos\Omega_x\cos\Omega_y]$$
$$b_3 = \sin\theta_x$$
$$c_3 = d_{rc}\cos\Omega_y - d_{rp}$$
$$d_3 = \Delta y(t)\sin\theta_x - (x_p + \Delta x(t))\cos\theta_x\sin\theta_y - f_p$$

[15]

to give equations 14 in the following form:

$$\frac{a_1 y(t) + c_1 y_c}{d_1} = \frac{a_2 y(t) + c_2 y_c}{b_2 t + d_2} = \frac{a_3 y(t) + c_3 y_c}{b_3 t + d_3} \qquad [16]$$

Using parts 1 and 2 of equation 16 to find y in terms of t:

$$\frac{a_1 y + c_1 y_c}{d_1} = \frac{a_2 y + c_2 y_c}{b_2 t + d_2} \qquad [17]$$

$$(a_1 y + c_1 y_c)(b_2 t + d_2) = d_1(a_2 y + c_2 y_c)$$
$$a_1 d_2 y + c_1 d_2 y_c + a_1 b_2 t y + c_1 b_2 t y_c = a_2 d_1 y + c_2 d_1 y_c$$
$$y(a_1 d_2 + a_1 b_2 t - a_2 d_1) = c_2 d_1 y_c - c_1 d_2 y_c - c_1 b_2 t y_c$$

$$y = y_c \frac{c_2 d_1 - c_1(b_2 t + d_2)}{a_1(b_2 t + d_2) - a_2 d_1}$$

And combining with equation 3 gives the full solution for a surface coordinate $(x_s, y_s, z_s)$ as follows:

$$x_s = x_c \frac{c_2 d_1 - c_1(b_2 t + d_2)}{a_1(b_2 t + d_2) - a_2 d_1} \qquad [18]$$

$$y_s = y_c \frac{c_2 d_1 - c_1(b_2 t + d_2)}{a_1(b_2 t + d_2) - a_2 d_1}$$

$$z_s = z_c \frac{c_2 d_1 - c_1(b_2 t + d_2)}{a_1(b_2 t + d_2) - a_2 d_1}$$

The expression for t is found by combining all three parts of equation 16 as follows:

$$q_2 = (d_2 + b_2 t) \qquad [19]$$
$$q_3 = (d_3 + b_3 t)$$

$$y = y_c \frac{c_2 d_1 - c_1 q_2}{a_1 q_2 - a_2 d_1}$$

$$\frac{a_2 y + c_2 y_c}{q_2} = \frac{a_3 y + c_3 y_c}{q_3}$$

$$\frac{a_2 \frac{c_2 d_1 - c_1 q_2}{a_1 q_2 - a_2 d_1} + c_2}{q_2} = \frac{a_3 \frac{c_2 d_1 - c_1 q_2}{a_1 q_2 - a_2 d_1} + c_3}{q_3}$$

$$a_2 q_3 \frac{c_2 d_1 - c_1 q_2}{a_1 q_2 - a_2 d_1} + c_2 q_3 = a_3 q_2 \frac{c_2 d_1 - c_1 q_2}{a_1 q_2 - a_2 d_1} + c_3 q_2$$

$$a_2 q_3 (c_2 d_1 - c_1 q_2) + c_2 q_3 (a_1 q_2 - a_2 d_1) = \\ a_3 q_2 (c_2 d_1 - c_1 q_2) + c_3 q_2 (a_1 q_2 - a_2 d_1)$$
$$-a_2 q_3 c_1 + a_1 c_2 q_3 = a_3 c_2 d_1 - a_3 c_1 q_2 + a_1 c_3 q_2 - a_2 c_3 d_1$$

$$-a_2 c_1(d_3 + b_3 t) + a_1 c_2(d_3 + b_3 t) = \\ a_3 c_2 d_1 - a_3 c_1(d_2 + b_2 t) + a_1 c_3(d_2 + b_2 t) - a_2 c_3 d_1$$
$$-a_2 c_1 d_3 - a_2 c_1 b_3 t + a_1 c_2 d_3 + a_1 c_2 b_3 t = \\ a_3 c_2 d_1 - a_3 c_1 d_2 - a_3 c_1 b_2 t + a_1 c_3 d_2 + a_1 c_3 b_2 t - a_2 c_3 d_1$$
$$t(-a_2 c_1 b_3 + a_1 c_2 b_3 + a_3 c_1 b_2 - a_1 c_3 b_2) = \\ a_3 c_2 d_1 - a_3 c_1 d_2 + a_1 c_3 d_2 - a_2 c_3 d_1 + a_2 c_1 d_3 - a_1 c_2 d_3$$

$$t = \frac{a_1 c_3 d_2 - a_1 c_2 d_3 + a_2 c_1 d_3 - a_2 c_3 d_1 + a_3 c_2 d_1 - a_3 c_1 d_2}{a_1 c_2 b_3 - a_1 c_3 b_2 + a_3 c_1 b_2 - a_2 c_1 b_3}$$

The calculation of the surface coordinates $(x_s, y_s, z_s)$ is accomplished by computing the substitution values of equations 15, and the value for t in equation 19; and applying these values to the coordinate equations 18.

Since t is also contained within the distortion terms $d_1, d_2, d_3$ in equations 15, an iterative solution is required. In the first iterative seep, zero distortion is assumed, the parameters in equations 15 are calculated, and a value for t in equation 19 is then found. These values are used to find estimates for x and y. The t in equation 19 is then recalculated. When large amounts of distortion are present, additional iterative steps may be needed.

Finally, the values for the surface coordinates $(x_s, y_s, z_s)$ in equation 18 are calculated using the final values from equations 15 and 19.

PHASE UNWRAPPING

In the preferred embodiment, the phases are unwrapped within computer 10 before being inserted into the above equations. In the raw phase map, there are periodic discontinuities across the surface 30, because the computed phase is modulo one fringe width (fringe period of 360°). The phase unwrapping process restores the integer wave portion to the phase, thus removing these discontinuities across surface 30.

In the preferred embodiment, the unwrapping method is a method called ordered phase unwrapping, which applies a quality metric to each pixel in the image, to rank pixels for the order in which they will be unwrapped. A preferred quality metric is:

$$Q_n = -\log\left[\left(\frac{1}{s_n + s_t}\right)^2 \sum \left(\frac{\phi_t + |\phi_n - \phi_i|}{s_t + s_t}\right)^2\right] - r_i r_w + d_i d_w$$

where:

$S_n, S_i$ are the signal-to-noise ratios for the nth and ith pixels, $S_t$ is the tolerance for the signal to noise ratios, $\phi_n, \phi_i$ are the phases for the nth and ith pixels, $S_t$ is the tolerance for the phase differences, $r_i$ is the radius from the center of the image, $r_w$ is the radius weighting, $d_i$ is the distance from the nearest inconsistent point or defect, and $d_w$ is the defect weighting.

This quality metric contains a mixture of the modulation intensity (signal-to-noise ratio), the phase deviation between neighboring pixels (with or without disparity gradient constraints), and geometric information such as distance of that particular pixel from image center, inconsistent pixels, or branch cuts and obscurations. Pixels close to the image center are given greater weight than pixels distant from the image center. The parameters $(s_t, \phi_t, r_w, d_w)$ allow weighting the difference components of the quality metric.

The unwrap processing begins by selecting one or more highly ranked pixels initially and then progressing down an ordered list of pixels using the following procedure:

First, the pixel at the top of the ordered list (i.e., having the highest value of quality metric) is unwrapped and removed from the list. Said pixel is unwrapped by changing its integer value (leaving the fractional portion unchanged), so that its phase value is within one half wavelength of the average phase of any unwrapped neighbors.

Second, pixels that abut the above-mentioned pixel and have not yet been unwrapped are added to the ordered list according to their quality metric.

Third, the above two steps are repeated until all the pixels have been unwrapped.

BLENDING

The blending step is an optional step. If performed, it is performed prior to the phase unwrapping step.

Many objects 4 to be measured optically reflect over a large range of intensity due to reflectivity variations and the high specularity of their surfaces 30. For such objects 4, the present invention preferentially uses a specially developed blending method to acquire multiple exposures of image data and to select the "best" phase over all exposures for each pixel, to achieve a high-quality image exposure. As part of the phase calculation processing, the signal-to-noise ratio W (modulation) of each pixel is computed. The "best" phase for each pixel is then defined as the phase from that exposure in which the modulation for that pixel is the highest. Similarly, other measures of "best" can be used, such as the quality metric described above in conjunction with phase unwrapping, or some subset of said quality metric.

As a further (optional) refinement of the blending step, thresholds can be used. For example, upper and lower thresholds of W can be used: if the measured W is below the lower threshold, the phase for that pixel is not used in subsequent calculations because the data is deemed unreliable; and if the measured W is above the upper threshold, the phase for that pixel is not used in subsequent calculations, because the camera 8 may have non-linear response when approaching saturation of its ability to respond to high intensities.

The thresholds can be pre-established as absolute values or as deviations from an optimum value of W or other parameter upon which the threshold is based. Said other parameters can include intensity I, the quality metric described above in conjunction with phase unwrapping, or some subset of said quality metric.

CALCULATION OF COORDINATES

Following the calculation of the raw phase map and the unwrapping of the phases, the computed phases are then converted into calculated three-dimensional coordinates by applying the system calibration parameters to each pixel data point, using the system geometry equations discussed above and the results of the calibration procedure discussed below. The finalized image data can then be represented as a fully-dimensioned three-dimensional object that can be measured or viewed on the display of computer 10 in any orientation, using conventional software.

With respect to FIG. 3, a preferred embodiment of projector 2 comprises a lamp 14 that illuminates a light beam through a heat filter 16 and illuminator optics 18 onto a grating pattern 22 which has been formed, e.g., on a transparent slide 20 that is held in place by slide holder 24 and horizontally translated by a motor 26 that is coupled to controller 12. The illuminated grating pattern 22 is then projected by projection lens 28 onto object 4.

The requisite phase shifting of the sinusoidal grating pattern 22 is normally achieved by one of two methods. In the first method, controller 12 commands motor 26 to translate slide holder 20 to three or four desired phase shifts at different times. At each of said times, camera 8 takes an exposure, with one frame of the algorithm corresponding to each exposure. This method is referred to as temporal phase shifting. In the second method, known as spatial phase shifting, slide holder 20 is not physically moved, and camera 8 takes just one exposure. The three or four frees of data are generated by means of computer 10 processing pixels that are approximately 90° and 180° (and, for four-bucket algorithms, 270°) apart from the original set of pixels corresponding to the first frame at 0°. Spatial phase shifting is faster than temporal phase shifting, with a slight loss in resolution. Other phase-shifting techniques are possible.

FIG. 5 shows an alternative embodiment of the present invention wherein two projectors 2a, 2b, rather than a single projector 2, are used. Projectors 2a, 2b and camera 8 are mounted within a rigid housing 32. The entire assembly 32 is portable and can be carried by hand by the person taking the optical measurements. The reason for having two projectors 2a, 2b is that the second projector 2b can illuminate surfaces 30 that the first projector 2a cannot because said surfaces 30 are hidden to projector 2a. Alternatively, two cameras 8 and a single projector 2 can be used.

FIG. 6a illustrates fringe lines 6 projected onto an object 4 whose surface 30 has a flat outer mold line. In this case, object 4 is a model of the outer surface of the United States space shuttle (Space Transportation System) with one of its heat shielding tiles missing. FIG. 6b illustrates the three-dimensional computer depiction 34 of the contour of the missing tile cavity after the present invention has calculated the x, y, and z coordinates thereof. FIG. 6c illustrates the results of applying an additional computer program to depiction 34 to convert the model of the missing tile into a model 36 of a tile which can fill the cavity.

FIGS. 7a, 7b, and 7c correspond to FIGS. 6a, 6b, and 6c, respectively, except that the outer mold line of surface 30 is curved rather than flat.

CALIBRATION METHOD

FIGS. 8 through 10 illustrate a first embodiment of a test calibration fixture 38 suitable for use in the present invention. FIGS. 11 through 15 illustrate a second embodiment of a test calibration fixture 46 suitable for use in the present invention. In each case, the purpose of the calibration fixture 38, 46 is to provide a set of points in three-dimensional space whose coordinates are known very accurately relative to one another. The location of a particular point 43, 51 is determined by measuring three adjacent surfaces 41, 49, then computing their unique intersection point.

Each calibration fixture 38, 46 comprises a variety of multi-faceted shapes 40, 48 that are rigidly mounted to a structure 52, 53 to insure their geometrical stability. Test calibration fixture 38 is characterized by a plurality of substantially identical truncated pyramids 40 each having countersunk (42) pins 44. Test calibration fixture 46 is characterized by a plurality of substantially identical truncated pyramids 48.

The fabrication tolerances of the angles and sizes of the surfaces 41, 49 of shapes 40, 48 are not critical. However, the faces of surfaces 41, 49 must be flat and smooth. Flat surfaces 41, 49 are used, because three or more points measured on each surface 41, 49 can be used to define the plane of the surface 41, 49. The intersection point 43, 51 for three intersecting plane surfaces 41, 49 can then be uniquely determined.

The calibration procedure for the present invention is described below as a six-step process.

1) In the first calibration step, the calibration fixture surfaces 41, 49 are accurately measured by conventional traceable mechanical methods to establish the three-dimensional locations of many points along the surfaces 41, 49, of the test calibration fixtures 38, 46. The intersection points 43, 51 are then computed. This establishes a line of dimensional traceability between these mechanical measurements and subsequent optical measurements performed by optical system 2, 8.

2) The second step in the calibration method is to place the test calibration fixture 38, 46 into the field of view of the optical system 2, 8. The mathematical derivation presented above assumes that maximum sensitivity will occur when the fringe lines 6 are oriented vertically, and minimum sensitivity will occur when said fringe lines 6 are oriented horizontally.

3) The third step in the method for calibrating the optical system of the present invention is to perform the optical measurements on the test calibration fixture 38, 46 to get a set of phases for each of a plurality of pixels $x_0$, $y_0$. These phases are referred to as $x_p$ in the above mathematical derivation. In the preferred embodiment, W, the signal-to-noise ratio, is also obtained for each pixel. This third step is performed identically to the corresponding step in the operational mode of the present invention (i.e., when the optical system 2, 8 is used to measure any object 4 of interest, and not just a test calibration object 38, 46).

4) Similarly, step 4 in the calibration method is identical to the corresponding step in the operational mode. In step 4, the raw phase map is unwrapped, e.g., using techniques described previously. After the unwrapped phase map has been calculated, the intersections of three plane surfaces are calculated to determine a unique point location in three-dimensional space. For each plane surface, a low order polynomial is fit to the phase data, which may have some curvature. The intersection point of the three surfaces is calculated to produce the phase $x_c$ value, and the camera pixel coordinates ($x_c, y_c$). This triplet of numbers ($x_c, y_c, x_t$) is then used in step 5.

5) Similarly, step 5 of the calibration method is identical to the corresponding step in the operational mode: equations 15, 18, and 19 above are used to calculate the three-dimensional coordinates $x_s$, $y_s$, and $z_s$. In order to do this in the calibration mode, as opposed to the operational mode, however, the approximate values of the extrinsic and intrinsic parameters of the optical system 2, 8 must be preselected. These values will be refined during the calibration process described below. The variable $f_c$ is preselected based upon the predetermined value of the focal length of camera 8. The variable $f_p$ is based upon the predetermined value of the focal length of projector 2. The variable $d_{rc}$ is the roughly measured distance between point r (the intersection of the projector 2 and camera 8 boresights) and camera 8. The variable $d_{rp}$ is the roughly measured distance between r and projector 2. The variable $\Omega_y$ is the roughly measured angle between the boresights of camera 8 and projector 2. All the other small correction parameters are initially set to a value of zero. Said parameters are $\theta_{xc}$, $\theta_{yc}$, $\Delta x_c$, $\Delta y_c$, $\Delta x_p$, $\Delta y_p$, $\theta x_p$, $\theta y_p$, $\Omega_x$, $\Omega_z$, and $\Delta_y$, where the subscript "c" refers to camera 8 and the subscript "p" refers to projector 2.

6) In the sixth step of the calibration method, the above system parameters are varied as the differences between the mechanically measured values of the x,y,z coordinates (from step 1) and the optically measured values of the x,y,z coordinates (from step 5) is minimized in a least squares sense; i.e., the following quantity is minimized:

$$\Sigma[(x_m-x_s)^2+(y_m-y_s)^2+(z_m-z_s)^2]$$

where the subscript "m" refers to the mechanically measured parameters of coordinates from step 1, and the subscript "s" refers to the optically measured coordinates from step 5.

This minimization is performed by using any non-linear optimization, e.g. grid search, Fletcher-Powell, gradient search, or conjugate gradient.

With the system parameters now determined, the calibration method is now complete.

The values of all of the extrinsic and intrinsic parameters resulting from said minimization are now fixed and are used for all subsequent calculations to convert measurement phase data to coordinate data when the optical system 2, 8 of the present invention is used in the operational mode. If the alignment between the camera 8 and projector 2 optics is changed, bumped, or otherwise misaligned, the calibration method described above must be re-performed.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A single-set-of-fringe-lines method for measuring in three-dimensional coordinates the surface shape contours of a three-dimensional object, said method comprising the steps of:

placing the object into the field of view of an optical system;

activating the optical system to project a single set of fringe lines onto the object and to obtain a raw phase map giving a phase at each of a plurality of pixels corresponding to the object;

unwrapping the phases; and converting the set of unwrapped phases into a set of three-dimensional coordinates of said object for each of said pixels, utilizing a set of equations containing fixed calibration parameters whose values have been established during a previous calibration procedure;

wherein the optical system comprises:

a fringe line projector that illuminates the object with a single set of fringe lines of sinusoidally varying intensity; and a camera having a field of view that includes at least a portion of said object illuminated by the fringe lines; wherein the calibration procedure does not entail the use of a calibration object containing a set of fringe lines; and the camera does not contain a set of fringe lines.

2. The method of claim 1 wherein intensity values are measured by said camera in at least three successive frames, said frames characterized by distinct phase shifts.

3. The method of claim 2 wherein the various frames are entered into by translating a holder that holds a transparent slide that contains said fringe lines, said holder placed within said projector; wherein:

the translation moves the fringe line pattern a fraction of a fringe width, corresponding to the amount of phase shift required.

4. The method of claim 3 wherein one fringe line is marked with a fiducial spot to provide a unique reference between measurement phase and position.

5. The method of claim 2 wherein the various frames are entered into with a stationary transparent slide that contains said fringe lines, said slide being located within said projector, by means of commanding a computer that is coupled to said camera to sequentially process sets of pixels that are spatially separated from each other by specified amounts of phase shift necessary to distinguish among the frames.

6. The method of claim 1 wherein three-dimensional coordinates of the object are displayed on a two-dimensional screen using a computer program that simulates three-dimensional objects on two-dimensional arrays.

7. The method of claim 1 wherein the step of unwrapping the phases is performed by a method of ordered phase unwrapping, in which a quality metric is applied to each pixel in the raw phase map, to rank pixels for the order in which they will be unwrapped.

8. The method of claim 1 wherein multiple activations of the optical system are conducted, with each activation producing a phase and a quality measure for all pixels; and for each pixel, a selected phase value is chosen based upon the activation having the highest value of the quality measure; whereby a blended raw phase map is obtained from the set of selected phases.

* * * * *